United States Patent
Maurer et al.

(10) Patent No.: US 9,830,696 B1
(45) Date of Patent: *Nov. 28, 2017

(54) SYSTEM AND METHOD FOR AUTOMATICALLY MEASURING THE DIMENSIONS OF AND IDENTIFYING THE TYPE OF EXTERIOR SIDING

(71) Applicant: STATE FARM MUTUAL AUTOMOBILE INSURANCE COMPANY, Bloomington, IL (US)

(72) Inventors: Jonathan D. Maurer, Bloomington, IL (US); Nicholas U. Christopulos, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,549

(22) Filed: Nov. 15, 2016

Related U.S. Application Data

(63) Continuation of application No. 14/982,074, filed on Dec. 29, 2015, now Pat. No. 9,536,301, which is a
(Continued)

(51) Int. Cl.
*G06T 7/60* (2017.01)
*G06K 9/62* (2006.01)
(Continued)

(52) U.S. Cl.
CPC ............ *G06T 7/001* (2013.01); *G06K 9/3216* (2013.01); *G06K 9/6202* (2013.01); *G06T 7/60* (2013.01);
(Continued)

(58) Field of Classification Search
CPC .......... G06T 7/602; G06T 7/60; G06K 9/6202
(Continued)

(56) References Cited

U.S. PATENT DOCUMENTS

| | | |
|---|---|---|
| 5,038,384 A | 8/1991 | Ohoba |
| 6,333,997 B1 | 12/2001 | Hashiya et al. |

(Continued)

OTHER PUBLICATIONS

Tu et al., "A novel method of intelligent analysis of weave paten based on image processin technology," 4th International Congress on Image and Signal Processing, Oct. 2011, pp. 38-41.
(Continued)

*Primary Examiner* — Yubin Hung
(74) *Attorney, Agent, or Firm* — Marshall, Gerstein & Borun LLP; Randall G. Rueth

(57) ABSTRACT

Methods, systems, and computer readable media are disclosed for determining a pixel-to-length ratio between a number of pixels disposed over a predetermined length of a reference object within an image of a siding sample and the predetermined length of the reference object. A first and second distance between respective first and second pairs of points within the image corresponding to respective first and second length measurements of the siding sample are determined, as well as a first and second number of pixels disposed between the first and second pair of points, respectively. Furthermore, the method, system, and computer readable medium disclose determining the first length measurement based on the pixel-to-length ratio and the first number of pixels, determining the second length measurement based on the pixel-to-length ratio and the second number of pixels, and identifying a siding product associated with the first and second length measurements.

20 Claims, 7 Drawing Sheets

Related U.S. Application Data continuation of application No. 14/717,051, filed on May 20, 2015, now Pat. No. 9,256,932, which is a continuation of application No. 14/595,722, filed on Jan. 13, 2015, now Pat. No. 9,064,177, which is a continuation of application No. 14/498,046, filed on Sep. 26, 2014, now Pat. No. 8,977,033, which is a continuation of application No. 14/228,617, filed on Mar. 28, 2014, now Pat. No. 8,885,916.

(51) Int. Cl.
*G06T 7/00* (2017.01)
*G06K 9/32* (2006.01)

(52) U.S. Cl.
CPC .... *G06T 7/602* (2013.01); *G06T 2207/10004* (2013.01); *G06T 2207/20048* (2013.01); *G06T 2207/20061* (2013.01); *G06T 2207/30108* (2013.01)

(58) Field of Classification Search
USPC .......................................................... 348/137
See application file for complete search history.

(56) References Cited

U.S. PATENT DOCUMENTS

| | | |
|---|---|---|
| 7,080,080 B1 | 7/2006 | Miller |
| 7,305,129 B2 | 12/2007 | Chellapilla et al. |
| 8,346,578 B1 | 1/2013 | Hopkins, III et al. |
| 8,885,916 B1 | 11/2014 | Maurer et al. |
| 8,977,033 B1 | 3/2015 | Maurer et al. |
| 9,064,177 B1 | 6/2015 | Maurer et al. |
| 9,256,932 B1 | 2/2016 | Maurer et al. |
| 2004/0233461 A1 | 11/2004 | Armstrong et al. |
| 2005/0025357 A1 | 2/2005 | Landwehr et al. |
| 2006/0210192 A1 | 9/2006 | Orhun |
| 2008/0114655 A1 | 5/2008 | Skidmore |
| 2008/0295582 A1 | 12/2008 | Lee et al. |
| 2009/0182749 A1 | 7/2009 | Walker |
| 2010/0303336 A1 | 12/2010 | Abraham et al. |
| 2011/0134238 A1 | 6/2011 | Kotchou et al. |
| 2012/0113141 A1 | 5/2012 | Zimmerman et al. |
| 2012/0311053 A1 | 12/2012 | Labrie et al. |
| 2013/0093882 A1 | 4/2013 | Kotzur et al. |
| 2014/0023280 A1 | 1/2014 | Lin et al. |
| 2014/0079326 A1 | 3/2014 | Ito et al. |
| 2014/0118496 A1 | 5/2014 | Calakli et al. |
| 2014/0161308 A1 | 6/2014 | Krishnamoorthy |
| 2014/0193039 A1 | 7/2014 | Wexler |
| 2015/0221128 A1 | 8/2015 | Bhatawadekar et al. |

OTHER PUBLICATIONS

U.S. Appl. No. 14/228,617, Notice of Allowance, dated Jul. 22, 2014.
U.S. Appl. No. 14/228,617, Office Action, dated Jun. 20, 2014.
U.S. Appl. No. 14/498,046, Notice of Allowance, dated Nov. 7, 2014.
U.S. Appl. No. 14/498,056, Notice of Allowance, dated Nov. 7, 2014.
U.S. Appl. No. 14/595,722, Notice of Allowance, dated Apr. 29, 2015.
U.S. Appl. No. 14/595,722, Office Action, dated Mar. 11, 2015.
U.S. Appl. No. 14/717,051, Notice of Allowance, dated Nov. 23, 2015.
U.S. Appl. No. 14/717,051, Office Action, dated Jul. 29, 2015.
U.S. Appl. No. 14/982,074, Nonfinal Office Action, dated Jul. 5, 2016.
U.S. Appl. No. 14/982,074, Notice of Allowance, dated Oct. 11, 2016.

SYSTEM AND METHOD FOR AUTOMATICALLY MEASURING THE DIMENSIONS OF AND IDENTIFYING THE TYPE OF EXTERIOR SIDING

CROSS-REFERENCE TO RELATED APPLICATIONS

This application is a continuation of U.S. patent application Ser. No. 14/982,074, filed Dec. 29, 2015, which issued as U.S. Pat. No. 9,536,301 on Jan. 3, 2017, which is a continuation of U.S. patent application Ser. No. 14/717,051, filed May 20, 2015, which issued as U.S. Pat. No. 9,256,932 on Feb. 2, 2016, which is a continuation of U.S. patent application Ser. No. 14/595,722, filed on Jan. 13, 2015, which issued as U.S. Pat. No. 9,064,177 on Jun. 23, 2015, which is a continuation of U.S. patent application Ser. No. 14/498,046, filed on Sep. 26, 2014, which issued as U.S. Pat. No. 8,977,033 on Mar. 10, 2015, which is a continuation of U.S. patent application Ser. No. 14/228,617, filed on Mar. 28, 2014, which issued as U.S. Pat. No. 8,885,916 on Nov. 11, 2014, each of which is incorporated herein by reference in its entirety.

FIELD OF THE DISCLOSURE

The present disclosure relates to siding identification and, more particularly, to measuring one or more dimensions of siding using a captured image and identifying products matching the measurements.

BACKGROUND

After sustaining exterior siding damage to a residence or a commercial building, a client typically files a claim with their insurance company. The insurance company then assigns an agent to investigate the claims to determine the extent of damage and to provide the client with appropriate compensation. Agents have had long-standing difficulties identifying the dimensions of the damaged exterior siding, which often results in repair delays and/or unnecessary expenses. For example, if the dimensions of damaged siding are misidentified, incorrectly ordered (and sometimes installed) replacement siding may not match the size of the existing siding to the satisfaction of the client. In this case, the contractor may need to return the replacement siding, reattempt identification of the damaged siding, and install (or reinstall) new replacement siding.

Correctly identifying siding dimensions can be an arduous process. Generally, an agent typically locates and removes a section of damaged siding from the building similar to the damaged siding to obtain a physical sample. The agent may need to take multiple measurements of the sample to sufficiently identify a type and manufacturer for a potential replacement. Using these measurements, the agent tries to identify a given style of siding (e.g., Dutchlap, clapboard, board and batten, etc.) by a measured face and profile size. This process requires the agent to travel to the site with measurement and/or siding removal tools. Furthermore, training is required for the agent to learn different styles of siding and how to properly recognize and measure the different types of faces and/or profiles for each style. Even when the dimensions of the siding are properly measured, properly identifying an available replacement siding product that best matches the dimensions of the sample is a significant problem.

DETAILED DESCRIPTION

Figure 1:
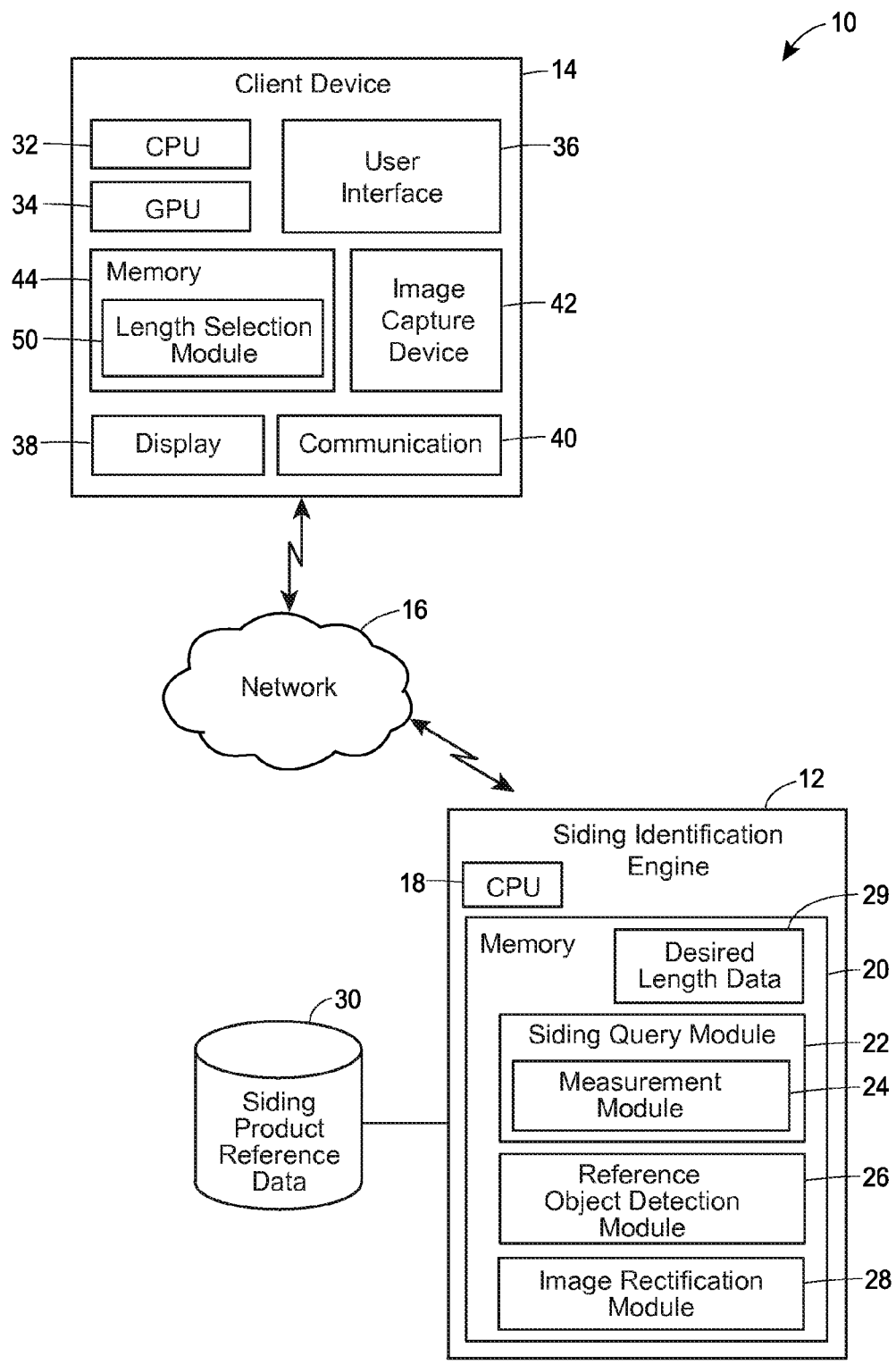
FIG. 1 is a block diagram of a siding identification system 10 in accordance with an exemplary embodiment of the present disclosure.

FIG. 1 is a block diagram of a siding identification system 10 in accordance with an exemplary embodiment of the present disclosure. Siding identification system 10 includes a client device 14 configured to connect to a siding identification engine 12 via a network 16. Network 16 may include any appropriate combination of wired and/or wireless communication networks. For example, networks 16 may include any combination of a local area network (LAN), a metropolitan area networks (MAN), a wide area network (WAN), and may facilitate a connection to the Internet. To provide further examples, network 16 may be include wired telephone and cable hardware, satellite, cellular phone communication networks, etc.

Client device 14 includes an image capture device 42, a user interface 36, a central processing unit (CPU) 32, a graphics processing unit (GPU) 34, a memory 44, a display 38, and a communication module 40. In an embodiment, client device 14 is implemented as a user equipment (UE) such as a mobile device, a computer, laptop, tablet, desktop, or any other suitable type of computing device.

Image capture device 42 is configured to capture an image in a digital format having any suitable number of pixels. Image capture device 42 may be implemented as a camera coupled to client device 14. Although image capture device 42 is illustrated in FIG. 1 as internal to client device 14, embodiments include image capture device 42 being internal or external to client device 14. For example, image capture device may be implemented as a webcam coupled to client device 14 and configured to communicate with client device 14. Furthermore, image capture device 42 may be implemented as a digital camera configured to transfer digital images to client device 14 and/or to siding identification engine 12. Such transfers may occur via a cable, a wireless transmission, network 16, and/or a physical memory card device transfer (e.g., SD Card, Flash card, etc.), for example.

User interface 36 is configured to allow a user to interact with client device 14. For example, user interface 36 may include a user-input device such as an interactive portion of display 38 (e.g., a "soft" keyboard displayed on display 38), an external hardware keyboard configured to communicate with client device 14 via a wired or a wireless connection (e.g., a Bluetooth keyboard), an external mouse, or any other suitable user-input device.

CPU 32 and/or GPU 34 are configured to communicate with memory 44 to store to and read data from memory 44. In accordance with various embodiments, memory 44 is a computer-readable non-transitory storage device that may include any combination of volatile (e.g., a random access memory (RAM), or a non-volatile memory (e.g., battery-backed RAM, FLASH, etc.).

Memory 44 is configured to store instructions executable on the CPU 32 and/or the GPU 34. These instructions may include machine readable instructions that, when executed by CPU 32 and/or GPU 34, cause the CPU 32 and/or GPU 34 to perform various acts.

Length selection module 50 is a portion of memory 44 configured to store instructions, that when executed by CPU 32 and/or GPU 34, cause CPU 32 and/or GPU 34 to enable user interface 36 to interact with a user. For example, executable instructions may enable user interface to display one or more prompts to a user, and/or accept user input, such as length measurements within an image of a siding sample. In an embodiment, instructions stored in length selection module 50 enable a user to select a particular length measurement within the image. For example, a user may utilize user interface 36 to specify a length selection by selecting two points within the image that denote a desired measurement length. To provide another example, a user may utilize user interface 36 to click, hold, or drag a cursor to define a desired measurement length.

Siding identification engine 12 includes CPU 18 and memory 20. Siding identification engine 12 is configured to communicate with client device 14 via network 16. Siding identification engine 12 is coupled to siding product reference database 30 and is configured to communicate with siding product reference database 30 to store to and read data from siding product reference database 30. Siding identification engine 12 is configured to receive one or more measurements from client device 14 and to identify one or more siding products based on the one or more measurements by accessing matching measurements from siding product reference database 30. Siding identification engine 12 is configured to send the identified one or more matching siding products to client 14.

Siding identification engine 12 may be implemented as any suitable computing device. In various embodiments, siding identification engine 12 is implemented within a web server, a laptop computer, a tablet computer, a smartphone, etc. In various embodiment, siding identification engine 12 is implemented as an integral part of client device 14, separate from client device 14, and external to client device 14. In accordance with embodiments in which siding identification engine 12 is implemented as an integral part of client device 14, CPU 32 may communicate with siding identification engine 12 (and siding produce reference database 30) and network 16 is not needed. Further in accordance with such an embodiment, CPU 32 and/or memory 44 may have a structure similar to, and provide the same functionality as, CPU 18 and/or memory 20, respectively.

CPU 18 is configured to communicate with memory 20 to store to and read data from memory 44. In accordance with various embodiments, memory 20 is a computer-readable non-transitory storage device that may include any combination of volatile (e.g., a random access memory (RAM), or non-volatile memory (e.g., battery-backed RAM, FLASH, etc.). Memory 20 is configured to store instructions executable by CPU 18. These instructions may include machine readable instructions that, when executed by CPU 32, cause CPU 18 to perform various acts.

Siding query module 22 and desired length data 29 are portions of memory 20 configured to store instructions executable by CPU 18. Desired length data 29 is a portion of memory 20 on which siding query module 22 operates. Siding query module 22 includes a measurement module 24 that, when executed by CPU 18, causes CPU 18 to calculate a length between two user-specified points, for example, in terms of pixels or length measurement units. In an exemplary embodiment, memory 20 includes a reference object detection module 26 configured to store instructions that, when executed by CPU 18, cause CPU 18 to detect a reference object within an image of a siding sample. In an embodiment, memory 20 includes an image rectification module 28 that, when executed by CPU 18, causes CPU 18 to adjust a perspective of an image and transform the image so that the image of the siding sample appears to captured from a forward facing perspective. This embodiment may be implemented, for example, if the image of the siding was captured at an angle deviating from a straight on perspective.

In accordance with various embodiments, any of siding query module 22, reference object detection module 26, and/or image rectification module 28 operates as a separately executable software application, a plugin that extends the functionality of another software application such as a web browser, an application programming interface (API) invokable by a software application, etc. The instructions included within any of siding query module 22, reference object detection module 26, and/or image rectification module 28 may be compiled and executable on the CPU 18 directly, or not compiled and interpreted by the CPU 18 on a runtime basis.

Siding identification engine 12 is configured to access siding product reference database 30 to provide siding product data to siding query module 22. Siding product reference database 30 may store measurement data, such as face size or profile size measurements, for individual siding products that represent potential replacement candidates for the siding sample. The siding product data may include not only measurement data of a particular siding product, but also manufacturer information, product information (e.g., a product number, a product color, a product name, a product price, etc.) In various embodiments, siding product reference database 30 is implemented within client device 14 or siding identification engine 12, separate from client device 14 or siding identification engine 12, or external to client device 14 or siding identification engine 12.

Although illustrated as a single engine in FIG. 1, in various embodiments, siding identification engine 12 may consist of any number or group of one or more siding identification engines. In accordance with such embodiments, each siding identification engine may be equipped with one or more CPUs and configured to operate independently of the other siding identification engines. Siding identification engines operating as a group may process requests from client device 14 individually (e.g., based on their availability) and/or concurrently (e.g., parallel processing). Siding identification engines operating as a group may process requests from the client device 14 in a prioritized and/or distributed manner. For example, an operation associated with processing a request may be performed on one siding identification engine while another operation associated with processing the same request (or a different request) is performed on another siding identification engine.

Figure 2:
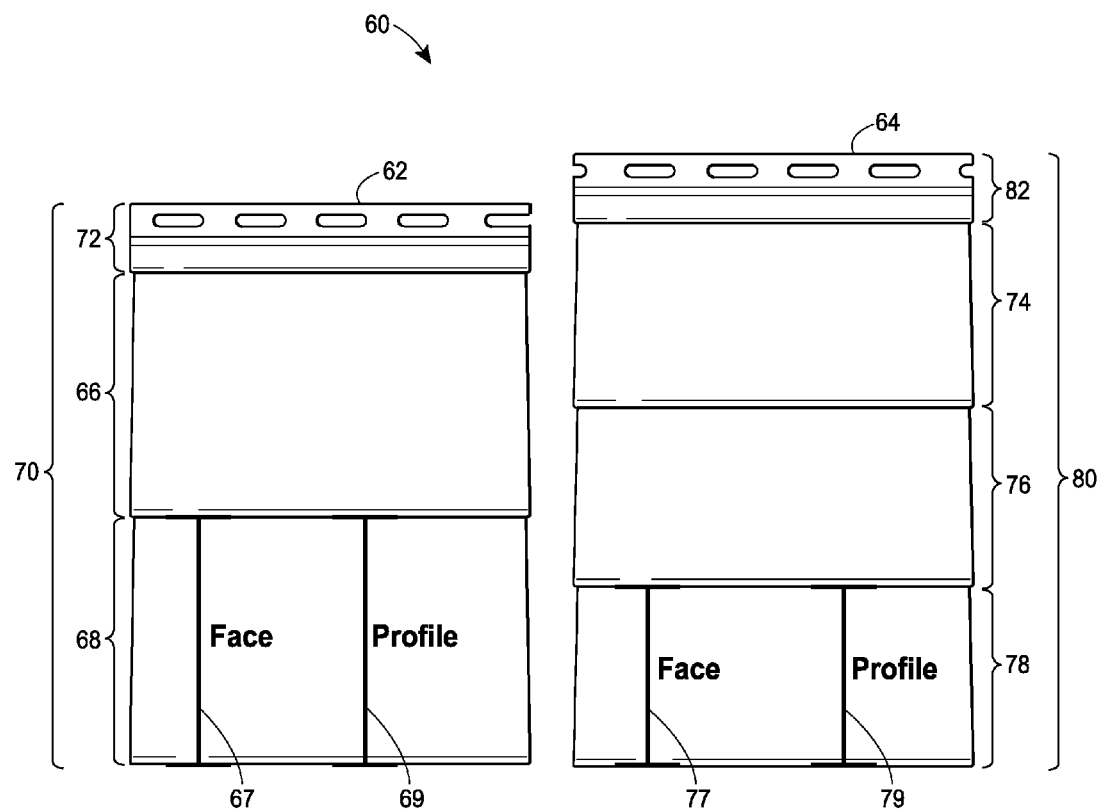
FIG. 2 is an example screenshot 60 that illustrates an image of siding samples 62 and 64 having a different number and size of faces that one another.

FIG. 2 is an example screenshot 60 that illustrates an image of siding samples 62 and 64 having a different number and size of faces that one another. Example screenshot 60 illustrates images of siding samples 62 and 64 that have a similar style but include different number of faces. For example, siding sample 62 is a double clapboard style that includes a nail hem 72 and two faces 66, 68 that occupy an entire width 70 of siding sample 62. Similarly, siding sample 64 is a triple clapboard style and includes a nail hem 82 and three faces 74, 76, 78 that occupy the width 80 of siding sample 64. In this example, width 70 of siding sample 62 is shorter than width 80 of siding sample 64 to illustrate that widths of siding may vary depending on the style, manufacturer, material, etc.

Generally speaking, a face of a siding sample is a uniform, flat portion of the siding, which may include multiple faces. For example, as shown in FIG. 2, the face of the siding includes a portion of the siding that is substantially parallel with a mounting surface to which the siding is affixed. In other words, the face of a siding sample is the portion is that is substantially plumb or substantially vertical when the siding is installed. The double clapboard style of siding sample 62 includes a face length 67 having the same length as profile length 69. Likewise, the triple clapboard style of siding sample 64 includes face length 77 having the same length as profile length 79.

Figure 3:
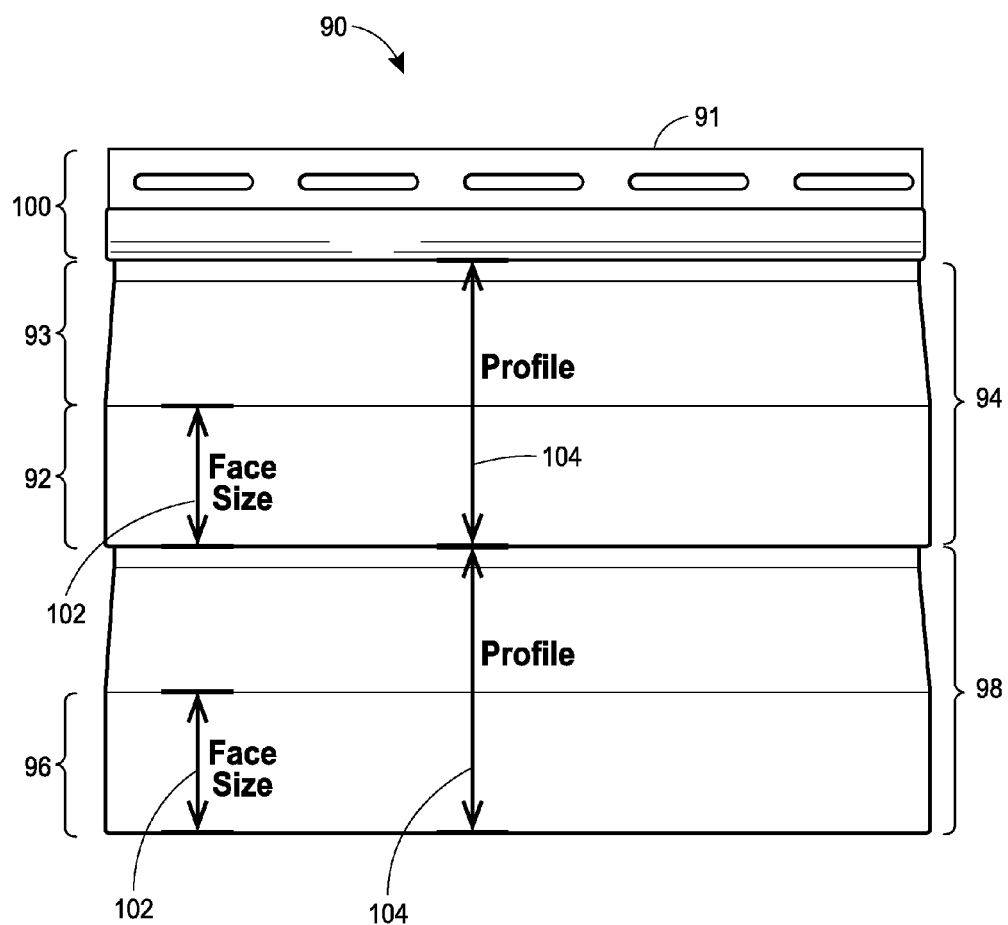
FIG. 3 is an example screenshot 90 that illustrates an image of a siding sample 91 having a face size shorter than a profile size.

FIG. 3 is an example screenshot 90 that illustrates an image of a siding sample 91 having a face size shorter than a profile size. In contrast to FIG. 2, siding sample 91 illustrates a style having different face and profile lengths. Other siding styles may have other dimensions that are different sizes from one another, and in different proportions. For example, as shown in FIG. 3, a siding sample 91 of a Dutch lap style includes two profiles 94, 98, two faces 92, 96, and a nail hem 100. Faces 92 and 96 are both flush or parallel to a mounting surface. Moreover, the remaining portion 93 of profile 94 is not flush to the mounting surface. Rather, portion 93 slopes back at an angle toward the mounting surface. Thus, in siding sample 91 of a Dutch lap style, face length 102 of the face 92 is a different length than profile length 104 of the profile 94. That is, profile length 104 of profile 94 wholly encompasses face length 102 of face 92. A Dutch lap style siding may include any number of different ratios of face length 102 to profile length 104.

According to industry nomenclature, the term "profile" generally refers to any contours formed in siding to create a distinctive style. For instance, various styles of siding or exterior structure coverings may include board and batten, clapboard, double beaded, traditional lap, Dutch lap, full bead, half bead, half rounds, logs, masonry, panel, shakes, soffit-beaded, soffit-flat panels, soffit-U groove soffit, soffit-V groove soffit, vertical panels, horizontal panels, scallops, etc. The profile of a siding style may be repeated throughout portion of the design over the width of the sample. For example, as illustrated in FIG. 2, siding sample 62, a double clapboard style, repeats the same profile twice and siding sample 64, a triple clapboard style, repeats the same profile three times. Furthermore, the term "face" generally refers to any generally flat portion of a piece of siding. But the term "face" may also refer to any flat portion of a piece of siding that runs parallel with the siding mounting surface that may include a batten or any other flat portion of a style of siding in addition to a generally flat portion of a piece of siding.

Figure 4:
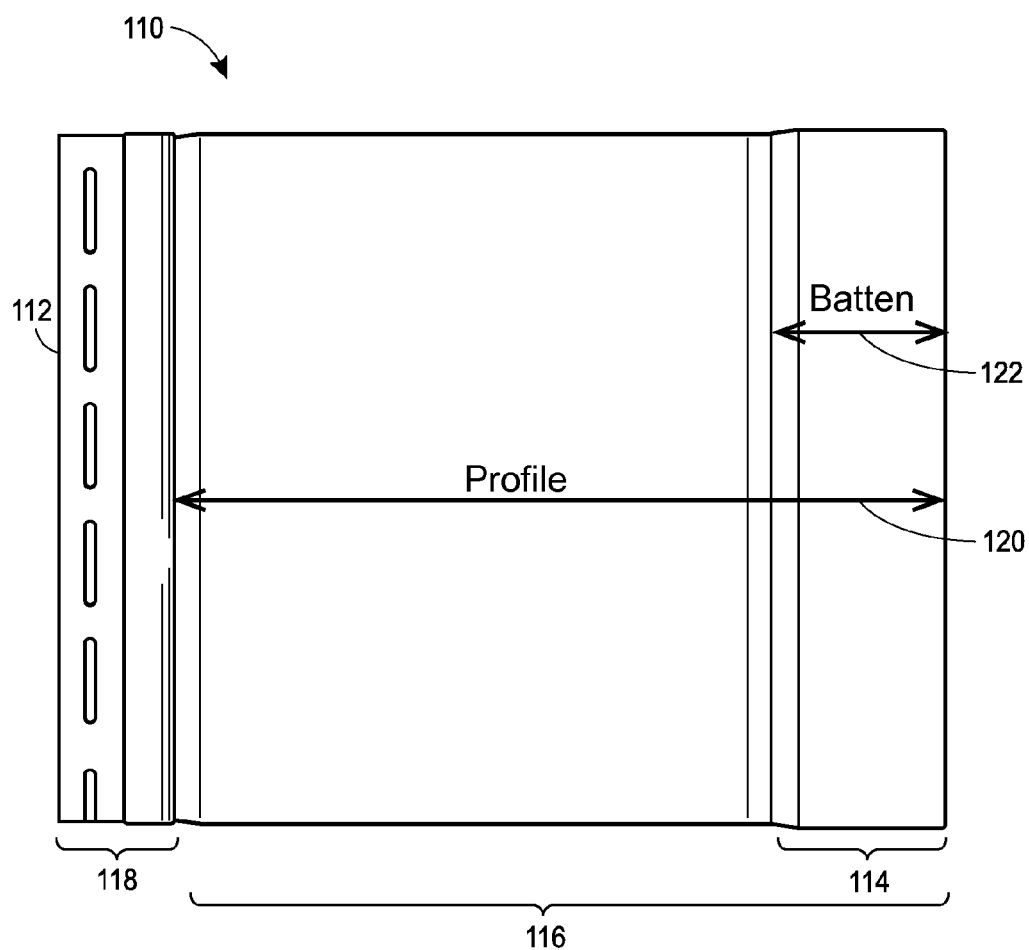
FIG. 4 is an example screenshot 110 that illustrates an image of a siding sample 112 with a profile size corresponding to a type of siding.

FIG. 4 is an example screenshot 110 that illustrates an image of a siding sample 112 with a profile size corresponding to a type of siding. Siding sample 112 illustrates a board and batten style and includes a batten portion 114, a profile portion 116, and a nail hem 118. Batten portion 114 is generally a raised portion relative to the rest of profile portion 116 of siding sample 112. Moreover, batten length 122 is generally shorter than profile length 120. Board and batten style siding 112 may include any number of different ratios of batten length 122 to profile length 120.

To determine various lengths of different portions of a particular siding sample, various embodiments of siding identification system 10 utilize a reference object within the image of the siding sample.

Figure 5:
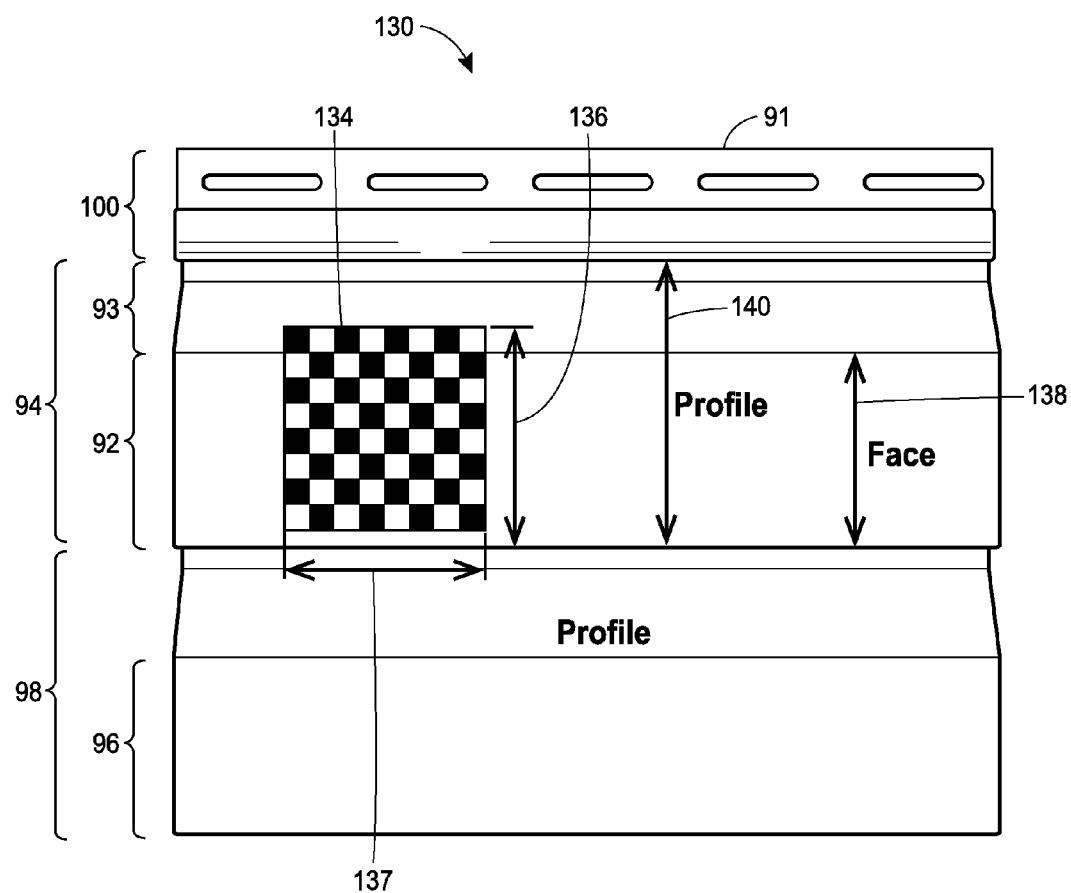
FIG. 5 is an example screenshot 130 that illustrates an image of siding sample 91 and a reference object in accordance with an exemplary embodiment of the present disclosure.

FIG. 5 is an example screenshot 130 that illustrates an image of siding sample 91 and a reference object 134 in accordance with an exemplary embodiment of the present disclosure. For example, a user (e.g., an agent) may affix or place the reference object onto a flat portion of a siding sample so that the reference object rests on a surface of the siding sample prior to capturing an image of it.

Examples of reference objects may include peel-and-stick decals, paper, cardboard, and/or any other suitable material cutouts having any number of sizes, colors, and/or patterns. Reference object 134 has a predetermined height 136 and width 137 in standard measurement units such as inches, centimeters, etc. For example, reference object 134 may be a square shape and have a height 136 measuring 3 inches and a width 137 measuring 3 inches. As will be appreciated by those of skill in the relevant art(s), reference object 134 may be implemented using any type of shape, such as a rectangle, a triangle, a hexagon, etc., that may be utilized in algorithmic pattern detection. To provide an example, reference object 134 may include a checkerboard or chessboard pattern as shown in FIG. 5. To provider another example, reference object may include a border trim of a first color and a fill inside the border trim of a second color, such as a white border with a black fill. Such colored patterns may facilitate detection of reference object 134 on a wide variety of different colored siding backgrounds. Reference object 134 may include any suitable pattern that is machine recognizable via algorithmic image detection, line detection, and/or any other suitable image processing or detection techniques.

Since reference object 134 may be implemented with lightweight materials such as decals, an agent can conveniently carry a variety of different sized reference objects best suited to measure different lengths within a siding sample image. In other words, an agent could use smaller reference objects for siding having smaller measurement lengths and larger reference objects for siding having larger measurement lengths. Since the reference objects are lightweight and easy to transport, an agent can carry an appropriate number of different sized reference objects without being overly encumbered in doing so.

In accordance with an embodiment, siding identification system 10 uses one or more of image detection, feature detection, and/or pattern detection techniques to detect reference object 134 within the image. As will be appreciated by those of ordinary skill in the relevant art(s), siding identification system 10 may implement any combination of a SIFT (Scale-invariant feature transform), a SURF (Speeded Up Robust Features), a Hough transform, and/or any other pattern recognition, edge detection, corner detection, blob detection, ridge detection, feature extraction, or image processing technique to detect reference object 134. Siding identification system 10 determines the height and/or width of reference object 134 in terms of any suitable units once reference object 134 is detected and its boundaries are determined. In accordance with an embodiment, siding identification system 10 determines the height and/or width of reference object 134 in terms of pixels.

For example, siding identification system 10 could detect the chessboard pattern of reference object 134 and determine that the height 136 of reference object 134 in the image is 500 pixels. Likewise, depending on the shape of the reference object 134, siding identification system 10 may also determine width 137 of reference object 134 in terms of pixels (e.g., 500 pixels if reference object 134 is a square shape). Once the height and/or width of reference object 134 in pixels is determined, siding identification system 10 may use the known height and/or width of reference object 134 (i.e., the physical dimensions) to calculate a ratio between the number of pixels (i.e., 500) and the known physical length corresponding to the pixel measurement. This ratio may be referred to as a pixel-to-length ratio. For example, if reference object 134 has physical measurements of 2 inches×2 inches, then the pixel-to-length ratio in the previous example would be $$\left(\frac{500 \text{ pixels}}{2 \text{ inches}}\right) = 250 \text{ pixels-per-inch.}$$

In an embodiment, siding identification system 10 uses this pixel-to-length ratio to calculate any other desired measurement of the siding sample within the image using a number of pixels associated with a desired length to be measured. Further in accordance with this example, once the pixel-to-length ratio is determined, a user selects a pair of points within the image represented by screenshot 130 such that the length spanning between the pair of points is face length 138. Siding identification system 10 then determines the number of pixels associated with face length 138, such as 437 pixels, for example. Using a pixel-to-length ratio of 250, siding identification system 10 determines that the physical length of face length 138 in this example is $$\left(\frac{437 \text{ pixels}}{250 \text{ pixels/inches}}\right) = 1.748 \text{ inches.}$$

Siding identification system 10 may repeat these calculations to obtain any number of other measurements within the image, such as profile length 140, etc.

The image represented by screenshot 130 shows reference object 134 affixed to face 92 of siding sample 91, although reference object 134 may be positioned at any location on siding sample 91. But it may be preferable to execute additional processing steps to accurately determine the pixel-to-length ratio if reference object 134 is not aligned parallel with a portion of the siding sample and/or the image of reference object 134 is not captured from a straight on perspective. As will be appreciated by those of ordinary skill in the relevant art(s), some image detection or line detection techniques require straight lines or utilize only horizontal or vertical lines. As a result, it is preferable in some embodiments of the present disclosure that images of sample siding are measured at a substantially straight on shot perspective and/or edges of reference object 134 and edges of siding sample 91 be aligned with one another and the horizontal-vertical plane. Various embodiments of the present disclosure include correcting an image to compensate for perspectives and/or alignments deviating from these preferences.

Various embodiments of the present disclosure include different levels of automation to obtain one more siding measurements and to identify one or more matching siding products. For example, once an image of the siding sample and reference object are captured, siding identification 10 may implement an automatic system or a semi-automatic system to measure portions of the siding sample and to identify matching siding products.

Embodiments of siding identification system 10 implementing automatic siding product identification first determines the type of siding via image recognition techniques and/or user entry. Once the type of siding is determined and a user enters the known physical lengths associated with the reference object, siding identification system 10 identifies edges of reference object 134 and determines a pixel-to-length ratio based on the detected edges and physical lengths entered by the user. Siding identification system 10 may utilize the face size and profiles corresponding to the identified style to identify face and/or profile measurements via image recognition. Siding identification system 10 may recognize edges in the image and determine a number of pixels associated with face length 92 based on information obtained from the corresponding siding style.

For example, siding identification system 10 may compare one or more stored reference images representative of a determined (or input) siding style to the captured image and determine which portion of the image corresponds to one or more desired length measurements (e.g., face and profile lengths). Once the appropriate portions of the image to be measured are identified, siding identification system 10 may determine a number of pixels spanning the measurements, a corresponding length measurement using the pixel-to-length ratio, and then query and return any matching siding products. In accordance with an embodiment of the present disclosure, a user is provided the matching siding products without user intervention once a siding image is obtained and the reference object dimensions are determined such that the pixel-to-length ratio is calculated.

Embodiments of siding identification system 10 implementing semi-automatic siding product identification may determine a type of siding via image recognition techniques and/or user entry. Once the type of siding is determined and a user enters the known lengths associated with the reference object for pixel-to-length calculation, desired siding measurements may be queried by the user. Alternatively, siding identification system 10 does not acquire a siding type in semi-automatic embodiments and a user may specify only length measurements for siding identification; however, to better narrow queried results to provide fewer siding product matches, it is preferable that a user specify a siding type in such embodiments to narrow the pool of potential matches.

Using FIG. 5 as an example, a user may utilize user interface 38 to define a desired line length measurement within the image. For example, a user may move, click, drag, etc., a cursor to specify two points within the image, the line formed between the two points corresponding to the desired length measurement. A user may repeat this any number of times to identify any number of length measurements, such as face length 92 and profile length 94, for example. Siding identification system 10 then determines a number of pixels associated with a corresponding length measurement and uses the pixel-to-length ratio to determine their associated physical lengths.

In accordance with both automatic and semi-automatic embodiments, siding identification system 10 utilizes any number of user prompts at various stages to verify the accuracy of the pixel-to-length ratio, identified edges and/or length measurements, siding type, siding measurements, and/or identified matching siding products. In accordance with various embodiments, siding identification system 10 may prompt a user for a siding type, verification of the siding type, to retake the image, to verify measurements identified in the image are correct (if automatically detected), verification of whether the image needs to be rectified and/or aligned, a display of the rectified and/or aligned image if correction is required, a verification of any siding measurements calculated using pixel-to-length ratios, a verification of the identified siding products, etc. Siding identification system 10 may find reference object dimensions and prompt a user for their known values or allow a user to select and specify these measurements within the image. In such embodiments, siding identification system 10 determines a pixel-to-length ratio of one or more lengths of reference object 134 without user prompts and/or user intervention (other than the entry of the physical dimensions of the reference object).

In accordance with an exemplary embodiment of the present disclosure, siding identification system 10 may additionally send color information obtained from the image that indicates the desired siding product color to be matched. A color matching system that may be implemented for this purpose is described in Patent Application Ser. No. 14/176,734, entitled "System and Method for Automatically Identifying and Matching a Color of a Structure's External Surface," concurrently filed herewith, which is fully incorporated by reference in its entirety. In accordance with color matching embodiments, siding product reference database 30 stores this color information, and siding identification engine 12 utilizes the color information together with the length measurements to further narrow the pool of identified matching siding products by color before returning the results to client device 14.

Figures 6A, 6B:
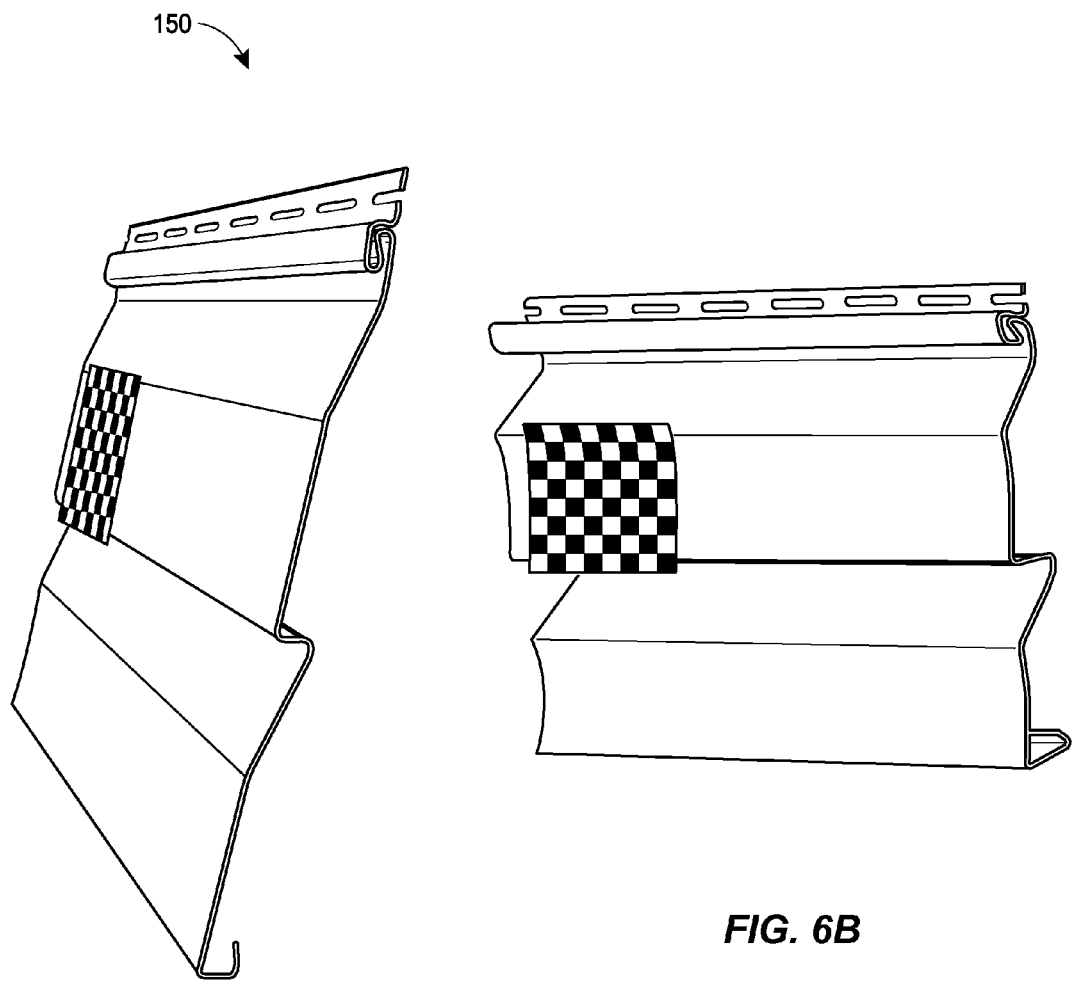
FIG. 6A is an example screenshot 150 that illustrates an image of a siding sample captured from a severe angle in accordance with an exemplary embodiment of the present disclosure.
FIG. 6B is an example screenshot 160 that illustrates an image of a siding sample after performing image rectification on the image of the siding sample in FIG. 6A in accordance with an exemplary embodiment of the present disclosure.

FIG. 6A is an example screenshot 150 that illustrates an image of a siding sample captured from a severe angle in accordance with an exemplary embodiment of the present disclosure. Using FIG. 5 as an example, if a user were to capture the siding sample image at an angle, reference object 134 and the siding sample profile would be positioned at an angle. In such a case, using the captured image to determine a pixel-to-length ratio associated with the dimensions of the reference object 134 will result in distorted measurements. Therefore, embodiments of the present disclosure correct for such perspective errors.

FIG. 6B is an example screenshot 160 that illustrates an image of a siding sample after performing image rectification on the image of the siding sample in FIG. 6A in accordance with an exemplary embodiment of the present disclosure. To correct for perspective errors, siding identification system 10 utilizes image rectification techniques. As will be appreciated by those of ordinary skill in the relevant art(s), once the image is detected, a corresponding homography of the image may be computed. For example, projective spaces associated with the reference object and lines within the siding sample image may be determined and associated matrix transformations may be applied to the projective spaces to provide image rectification. In other words, once a reference object within a siding sample is rectified, the resulting rectified image compensates for perspective error. As shown in FIG. 6B, once rectified, the reference object image and image are transformed as if taken from a straight on perspective (i.e., perpendicular to the reference object plane). FIGS. 6A and 6B illustrate an extreme example of image rectification for the purposes of explanation. In practice, it is preferable for a user to generally make a good attempt to record the image in a straight on perspective initially, with the image rectification providing a refined image to compensate for any user error.

Additionally or alternatively, embodiments of the present disclosure include image alignment techniques to align both the reference object and one or more edges of the siding image such that they are both aligned with a horizontal-vertical plane. Using FIG. 5 as an example, the horizontal and vertical edges of reference object 134 are aligned in the horizontal-vertical plane. However, a user may not initially affix reference object 134 to the siding sample in this way. Furthermore, the image may be taken from a straight on perspective but skewed such that the image is tilted with respect to the horizontal and vertical axes. Since pixels are typically square in shape, edges of reference object 134 and the siding sample taken at an angle will be represented by a different number of pixels compared to a number of pixels constituting a completely horizontal or vertical edge length. As a result, if edges of reference object 134 and the siding sample are not aligned with one another and the horizontal-vertical plane, the pixel-to-ratio calculations from a misaligned reference object and/or skewed image may result in less accurate measurements.

Therefore, to correct for such alignment errors, embodiments of the present disclosure use image alignment techniques to compensate for image skew. In accordance with such embodiments, line detection is utilized to measure the angles of lines within the image and then correct for skew via coordinate transformations. As will be appreciated by those of skill in the relevant art(s), examples of line detection techniques and transformations include Hough and Radon transforms. Once the alignment techniques are applied, reference object 134 and siding sample 91 are aligned with one another and the horizontal-vertical place. As a result, pixel-to-length ratios and subsequent calculations are performed based on a true pixel representation in a single dimension, increasing the accuracy of these measurements.

Figure 7:
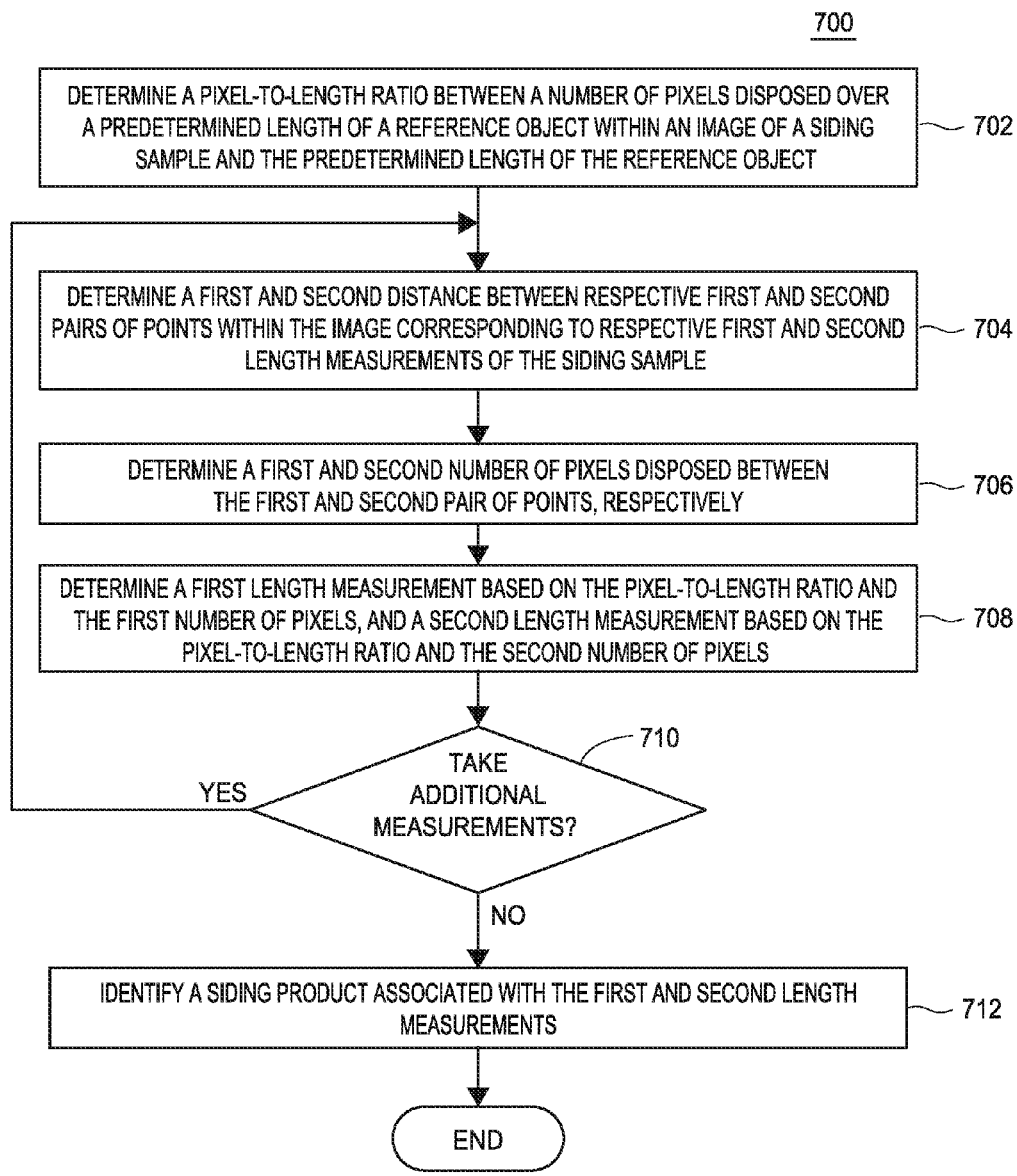
FIG. 7 illustrates a siding identification method 700 in accordance with an exemplary embodiment of the present disclosure.

FIG. 7 illustrates a siding identification method 700 in accordance with an exemplary embodiment of the present disclosure. In various embodiment, siding identification method 700 is implemented as a part of siding identification system 10 as shown in FIG. 1.

Method 700 begins at block 702, at which a communication device determines a pixel-to-length ratio between a number of pixels disposed over a predetermined length of a reference object within an image of a siding sample and the predetermined length of the reference object. This communication device could include, for example, client device 14 as shown in FIG. 1, and this image could include, for example, screenshot image 130 as illustrated in FIG. 5.

At block 704, the communication device determines a first and second distance between respective first and second pairs of points within the image corresponding to respective first and second length measurements of the siding sample. In another embodiment, one pair of points and one length measurement is determined. The first and second length measurements could include, for example, face and profile lengths as illustrated in FIG. 5.

At block 706, the communication device determines a first and second number of pixels disposed between the first and second pair of points, respectively. In another embodiment, one number of pixels is determined corresponding to one pair of points.

At block 708, the communication device determines the first length measurement based on the pixel-to-length ratio and the first number of pixels and the second length measurement based on the pixel-to-length ratio and the second number of pixels. In another embodiment, one length measurement is determined based on the pixel-to-length ratio and the first number of pixels.

At block 710, a decision is made whether to take additional measurements. In accordance with an embodiment, block 710 may be skipped, for example, if an automatic identification system is used and a predetermined number of measurements are to be made. Block 710 may be performed, for example, in a semi-automatic identification system whereby a user is prompted after one or more measurements have been made to determine if more measurements are desired. If more measurements are to be made, method 700 continues back to block 704 to obtain additional pairs of measurement points. If no additional measurements are to be made, method 700 continues to block 712.

At block 712, the communication device identifies a siding product associated with the first and second length measurements. In accordance with an embodiment, the communication device, such as client device 14, for example, sends the first and second length measurements to another communication device, such as siding identification engine 12, for example. In accordance with such embodiments, siding identification engine 12 identifies the siding product and sends these identified products back to the first communication device.

The Figures and accompanying description provided throughout this disclosure have been provided largely in reference to siding samples. The embodiments as described throughout this disclosure are equally applicable to siding that is installed and to siding samples that have been removed from a structure. For example, an agent may use any of the described embodiments to capture an image of a portion of installed siding that is undamaged and a reference object, and identifying siding products are matched based on such an image.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computing device, comprising:
a memory configured to store computer-readable instructions; and
a processor configured to execute the computer-readable instructions stored in the memory to:
selectively align edges of a reference object included within an image of a two-dimensional object with edges of the two-dimensional object to provide an aligned reference object;
calculate a first dimension of the two-dimensional object based upon a pixel dimension of the aligned reference object and a first number of pixels spanned by the first dimension of the two-dimensional object within the image; and
identify a product associated with the first dimension of the two-dimensional object.

2. The computing device of claim 1, wherein the processor is further configured to determine that the reference object needs to be aligned when the reference object is not aligned parallel with a portion of the two-dimensional object within the image.

3. The computing device of claim 1, wherein the processor is further configured to rectify the image of the two-dimensional object so the perspective of the two-dimensional object faces forward if the reference object includes perspective distortion.

4. The computing device of claim 1, wherein the processor is further configured to measure a second dimension of the two-dimensional object based upon the pixel dimension of the aligned reference object and a second number of pixels spanned by the second dimension of the two-dimensional object within the image, and to identify the product based upon the first and second dimensions of the two-dimensional object.

5. The computing device of claim 4, wherein:
the two-dimensional object is a siding sample,
the first dimension of the two-dimensional object corresponds to a face dimension of the siding sample,
the second dimension of the two-dimensional object corresponds to a profile dimension of the siding sample, and
the processor is further configured to identify the product as a siding product stored in a siding product reference database having a face dimension and a profile dimension matching the first dimension and the second dimension of the siding sample, respectively.

6. The computing device of claim 1, wherein the processor is further configured to detect the reference object within the image using at least one of:
a Scale-Invariant Feature Transform (SIFT);
a Speeded Up Robust Features (SURF);
a Radon transform; or
a Hough transform.

7. A product identification engine, comprising:
a memory configured to store computer-readable instructions; and
a processor configured to execute the computer-readable instructions stored in the memory and to identify a siding product by:
selectively aligning edges of a reference object included within an image of a two-dimensional object received from a mobile computing device with edges of the two-dimensional object to provide an aligned reference object;
calculating a first dimension of the two-dimensional object based upon a pixel dimension of the aligned reference object and a first number of pixels spanned by the first dimension of the two-dimensional object within the image; and
identifying a product associated with the first dimension of the two-dimensional object.

8. The product identification engine of claim 7, wherein the processor is further configured to cause the product identification engine to wirelessly communicate the identified product associated with the first dimension to the mobile computing device.

9. The product identification engine of claim 7, wherein the processor is further configured to determine that the reference object needs to be aligned when the reference object is not aligned parallel with a portion of the two-dimensional object within the image.

10. The product identification engine of claim 7, wherein the processor is further configured to rectify the image of the two-dimensional object so the perspective of the two-dimensional object faces forward if the reference object includes perspective distortion.

11. The product identification engine of claim 7, wherein the processor is further configured to measure a second dimension of the two-dimensional object based upon the pixel dimension of the aligned reference object and a second number of pixels spanned by the second dimension of the two-dimensional object within the image, and to identify the product based upon the first and second dimensions of the two-dimensional object.

12. The product identification engine of claim 11, wherein:
the two-dimensional object is a siding sample,
the first dimension of the two-dimensional object corresponds to a face dimension of the siding sample,
the second dimension of the two-dimensional object corresponds to a profile dimension of the siding sample, and
the processor is further configured to identify the product as a siding product stored in a siding product reference database having a face dimension and a profile dimension matching the first dimension and the second dimension of the siding sample, respectively.

13. The product identification engine of claim 7, wherein the processor is further configured to detect the reference object within the image using at least one of:
a Scale-Invariant Feature Transform (SIFT);
a Speeded Up Robust Features (SURF);
a Radon transform; or
a Hough transform.

14. A system, comprising:
a mobile computing device configured to transmit an image of a two-dimensional object that includes a reference object within the image; and
an external computing device configured to:
selectively align edges of a reference object included within the image with edges of the two-dimensional object to provide an aligned reference object;
calculate a first dimension of the two-dimensional object based upon a pixel dimension of the aligned reference object and a first number of pixels spanned by the first dimension of the two-dimensional object within the image; and
identify a product associated with the first dimension of the two-dimensional object.

15. The system of claim 14, wherein the external computing device is further configured to wirelessly transmit the identified product to the mobile computing device.

16. The system of claim 14, wherein the external computing device is further configured to determine that the reference object needs to be aligned when the reference object is not aligned parallel with a portion of the two-dimensional object within the image.

17. The system of claim 14, wherein the external computing device is further configured to rectify the image of the two-dimensional object so the perspective of the two-dimensional object faces forward if the reference object includes perspective distortion.

18. The system of claim 14, wherein the external computing device is further configured to measure a second dimension of the two-dimensional object based upon the pixel dimension of the aligned reference object and a second number of pixels spanned by the second dimension of the two-dimensional object within the image, and to identify the product based upon the first and second dimensions of the two-dimensional object.

19. The system of claim 18, wherein:
the two-dimensional object is a siding sample,
the first dimension of the two-dimensional object corresponds to a face dimension of the siding sample,
the second dimension of the two-dimensional object corresponds to a profile dimension of the siding sample, and the external computing device is further configured to identify the product as a siding product stored in a siding product reference database having a face dimension and a profile dimension matching the first dimension and the second dimension of the siding sample, respectively.

20. The system of claim 14, wherein the external computing device is further configured to detect the reference object within the image using at least one of:
  a Scale-Invariant Feature Transform (SIFT);
  a Speeded Up Robust Features (SURF);
  a Radon transform; or
  a Hough transform.

\* \* \* \* \*